United States Patent [19]

Mundo

[11] Patent Number: 4,786,459
[45] Date of Patent: Nov. 22, 1988

[54] VEHICLE IMPACT ENERGY ABSORBER

[76] Inventor: James D. Mundo, 6601 Raintree Dr., Canton, Mich. 48187

[21] Appl. No.: 79,164

[22] Filed: Jul. 29, 1987

[51] Int. Cl.$^4$ ...................... B60R 19/26; B60R 19/36
[52] U.S. Cl. ..................................... 293/132; 293/102; 293/135; 188/134; 267/139
[58] Field of Search ................... 293/1, 102, 119, 132, 293/133, 134, 135, 155, 131; 188/82.77, 134, 381; 267/134, 139

[56] References Cited

U.S. PATENT DOCUMENTS

| | | | |
|---|---|---|---|
| 3,059,727 | 10/1962 | Fuchs | 188/381 |
| 3,448,840 | 6/1969 | Rosin | 188/134 X |
| 3,718,326 | 2/1973 | Ristau | 267/140 |
| 3,858,863 | 1/1975 | Mazelsky | 293/134 X |
| 4,524,851 | 6/1985 | Sawano et al. | 188/381 X |

Primary Examiner—Robert B. Reeves
Assistant Examiner—Russell D. Stormer
Attorney, Agent, or Firm—Rhodes and Boller

[57] ABSTRACT

An energy absorber for preventing vehicle damage during low speed collisions comprising a threaded post for slideably mounting a vehicle bumper to a vehicle structure, a housing for tightly embracing a friction member, a friction member rotatably mounted in the housing, a sleeve engaging the threaded post which is responsive to the movement of the bumper for rotatably driving the friction member and a clutch for engaging the friction member with the sleeve. During a low speed vehicle impact, the inward displacement of the vehicle's bumper, with respect to the vehicle's structure, rotatably drives the friction member in the housing and the kinetic energy of the moving vehicle is absorbed by the work done in rotating the friction member in the housing. After the impact, the bumper is returned to its initial position by a spring.

9 Claims, 2 Drawing Sheets

VEHICLE IMPACT ENERGY ABSORBER

BACKGROUND OF THE INVENTION

Vehicle damage from low speed collisions during parking and crowded traffic conditions has a major effect on the costs of insurance premiums and vehicle ownership. Federally mandated regulations limiting vehicle damage during low speed collisions have required manufacturers to provide energy absorbing systems as standard equipment in new passenger vehicles. These systems have affected vehicle appearance and have resulted in significant increases in vehicle weight and cost. In addition, vehicle complexity has been increased with current systems which require unique energy absorbers to accommodate differences in vehicle weight and strength of vehicle structures.

During a collision, the kinetic energy of a vehicle is dissipated with an energy absorption system by the work of displacing the vehicle's bumper inwardly with respect to the vehicle structure against the resistance force of an energy absorber. An optimum energy absorption system would provide a constant resistance force to the inward displacement of the bumper. The constant resistance force would minimize the required inward displacement of the bumper and the forces acting on the vehicle structure. By necessity, the maximum force developed by an energy absorption system must be held below the failure point of the vehicle structure reacting the absorber force.

Energy absorption systems in the prior art consist primarily of two types, namely, elastic and hydraulic systems. The elastic system is a linear system in which the resistance force to bumper inward displacement is produced by deflecting an elastic device and varies directly with bumper displacement.

Elastic systems include bumpers having rubber and other elastic materials and bumper mountings which rely on rubber elements which deflect during vehicle collisions. The major disadvantage of elastic systems is that they absorb only one-half the energy of the ideal constant force system. As a result, large bumper displacements or high absorber forces are required to dissipate the kinetic energy of a low speed vehicle collision. Another disadvantage is they are heavy in weight. Another disadvantage is that they tend to be relatively large and difficult to adapt to vehicle designs.

Hydraulic systems utilize hydraulic absorbers which are similar in principle to vehicle suspension shock absorbers. Energy is absorbed by forcing a hydraulic fluid through an orifice. The hydraulic absorber is a more efficient energy absorber than the elastic absorber but more complex and higher in cost. A further disadvantage of the hydraulic absorber, as compared to the ideal constant force absorber, is that the force which the absorber produces is a function of impact velocity. This means that larger bumper displacements occur at impact speeds less than the speed, corresponding to the maximum absorber force, as determined by the limiting strength of the vehicle structure than with the ideal constant force absorber. Large bumper displacements are undesireable because of the increased possibility of vehicle damage.

With the foregoing in view, an effective, compact, energy absorber, lower in cost than the hydraulic absorber, capable of developing a constant force over the range of vehicle impact speeds for which damage protection is sought would provide improvements over the prior art. Moreover, further benefit would be provided if the constant force of the absorber could be adjusted by the manufacturer to accommodate a range of vehicle weights and limits of structural strength.

SUMMARY OF THE INVENTION

The present invention is directed toward prevention of vehicle damage during low speed collisions and more particularly to a bumper mounting apparatus which develops a constant force for dissipating the kinetic energy of the vehicle during a collision. The invention comprises an energy absorber which absorbs the energy of a vehicle impact by rotating a frictional member in a housing which tightly embraces the rotating frictional member. The frictional member is rotated by a sleeve which is driven by the inward displacement of a vehicle bumper during a vehicle collision. After the collision the vehicle bumper is returned to its initial position by a mechanical spring which is contained in the absorber.

An important feature of the invention is that a constant resistance force is developed by the impact absorber which is independent of vehicle speed.

Another feature is that the absorber can be adjusted to accommodate a range of differences in vehicle weight and limiting strengths of vehicle structures.

It is a primary object of the invention to provide an effective, compact, low cost, energy absorber, for dissipating the kinetic energy of a moving vehicle undergoing a collision.

It is another object, in addition to the foregoing object, to provide an impact absorber which is adjustable to accommodate a range of differences in vehicle weight and strengths of vehicle structures.

It is another object, in addition to the foregoing objects, to provide an impact absorber which produces a constant resistance force independent of vehicle speed.

The foregoing features and objects, together with additional features, objects and advantages of the invention, will become apparent from the ensuing description and accompanying drawings which describe the invention in detail.

The best mode contemplated in practicing the invention is disclosed and the subject matter in which exclusive property rights are claimed is set forth in each of the numbered claims at the conclusion of the detailed description of the invention.

DETAILED DESCRIPTION OF THE PREFERRED EMBODIMENT

Figure 1:
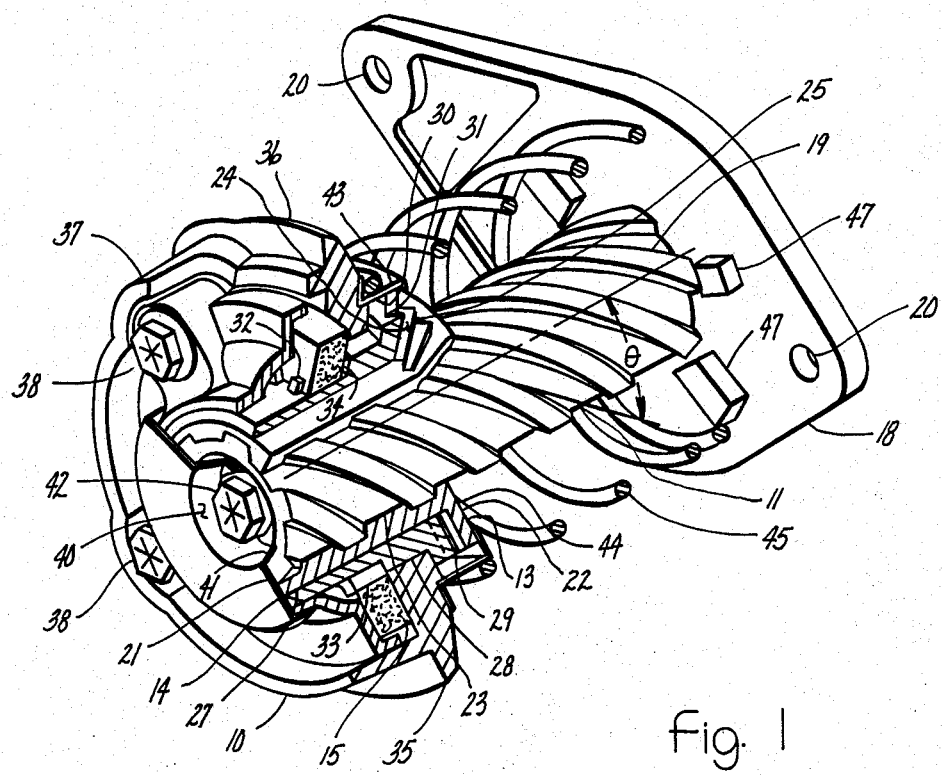
FIG. 1 is a perspective view drawn in partial section of a vehicle energy absorber.
Figure 2:
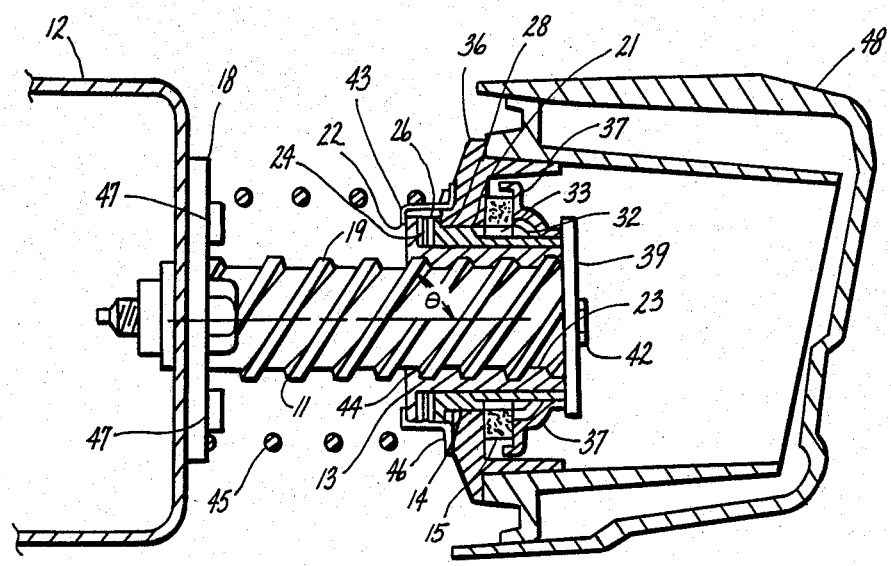
FIG. 2 is a longitudinal sectional view showing the energy absorber of FIG. 1 mounted to a vehicle bumper and a vehicle structure.
Figure 3:
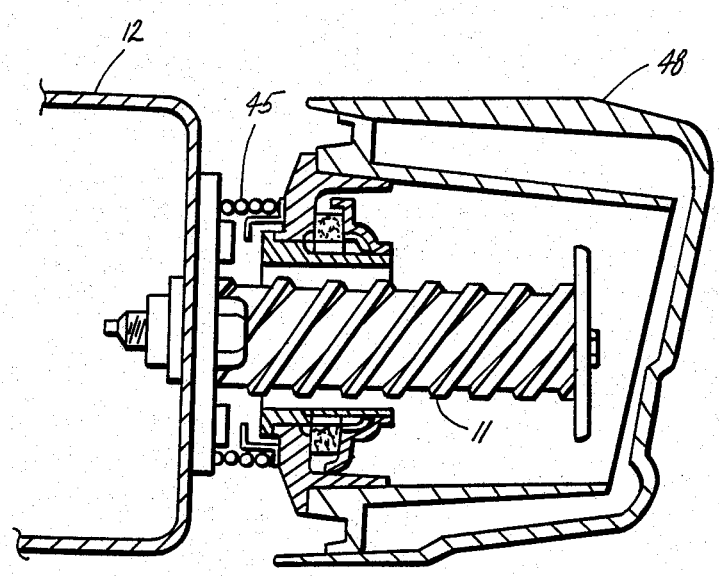
FIG. 3 is a longitudinal sectional view showing the energy absorber of FIG. 1 mounted to a vehicle bumper which has been displaced inwardly with respect to the vehicle structure during a vehicle collision.
Figure 4:
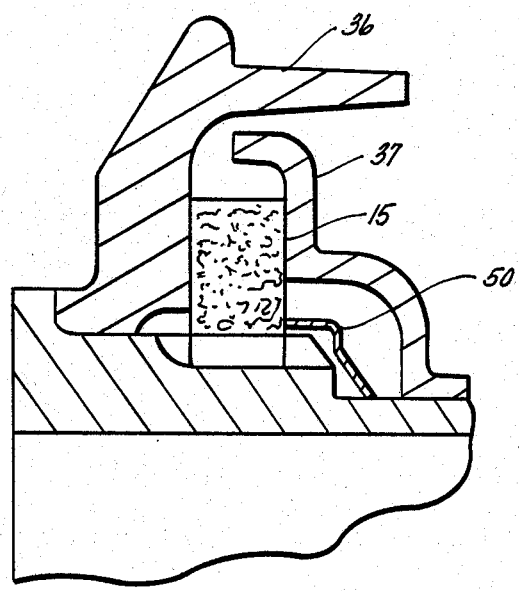
FIG. 4 is an enlarged fragmentary portion of FIG. 2.

Referring now to the drawings wherein like numerals designate like and corresponding parts throughout the several views, the preferred embodiment of the vehicle energy absorber 10 disclosed wherein for illustrative purposes comprises an externally threaded spindle 11 adapted for mounting in a horizontal position to a vehicle structure 12, an inner sleeve 13 carried on said spindle 11, an outer sleeve 14 carried on said inner sleeve 13, a friction member 15 rotatably driven by said outer sleeve 14, and a housing 35 which tightly embraces the friction member 15.

The construction of the energy absorber 10 is best understood by reference to FIG. 1. The spindle 11 has an externally threaded cylindrical body portion 17 and an adjoining flange portion 18. The thread 19 on the body portion 17 is a multiple thread of preferably a square tooth form but may also be an involute or other suitable form. The helix angle "θ" of the thread 19 is not critical but should be preferably less than 45 degrees to prevent binding between the spindle 11 and the inner sleeve 13 which threadably engages the spindle 11. On the flange portion 18 of the spindle 11 there is provided a pair of apertures 20 for fixedly mounting the spindle 11 to the vehicle structure 12.

The inner sleeve 13 which threadably engages the spindle 11 has a tubular body portion 21 and an adjoining circular flange portion 22. The inner sleeve 13 is positioned on the spindle 11 with the flange portion 22 nearest the structure 12 of the vehicle. The tubular body portion 21 has the multiple internal thread 23 which corresponds to the external thread 19 of the spindle 11. On the outward face 24 of the flange 22 which adjoins the body portion 21 there is provided a plurality of radially extending serrations 25 which serve as the driving member of a clutch 26.

The outer sleeve 14 is concentrically mounted on the inner sleeve 13 and has a body portion 27 and a shoulder 28 on the body portion 27 and an adjoining flange portion 29. On face 30 of the outer sleeve 14 which confronts the serrations 25 of the inner sleeve 13 there is provided a corresponding plurality of radially extending serrations 31 which serve as the driven member of the clutch 26.

On the body portion 27 of the outer sleeve 14 there is provided an external spline 32 which engages an internal spline 33 of the friction member 15. The friction member 15 is a generally disc shaped member with an internal spline 33, corresponding to the external spline 32 of the outer sleeve 14 and is retained to the outer sleeve 14 by the vertical face 34 of the outer sleeve shoulder 28, a housing 35 which tightly embraces the friction member 15, and a retainer 50 mounted on the forward end portion of the outer sleeve 14.

The housing 35 which embraces the friction member is comprised of an inner housing 36 which is concentrically mounted on the shoulder 28 of the outer sleeve 14 and an outward housing 37 which is concentrically mounted on the outer sleeve 14 forward of the shoulder 28 and is retained to the inner housing 36 by threaded fasteners 38 which threadably engage the inner housing 36. The threaded fasteners 38 also control the clamping force by which the housing 35 tightly embraces the friction member 15.

The housing 35, friction member 15, inner sleeve 13 and outer sleeve 14 are retained at one end to the spindle 11 by a circular retainer 39 having a depressed center portion 40 which pilots into a recess 41 of the spindle 11 and a fastener 42 which threadably engages the forward end portion of the spindle 11 and are retained at the other end by cup shaped retainer 43 which seats against the innermost face 44 of the inner housing 36. The inner retainer 43 is held in position against the inner housing 36 by a helical spring 45 which bears against an inner retainer flange 46 and radially positions the retainer 43. The innermost end portion of the spring 45 bears against the spindle flange 18 and is concentrically located on the flange 18 by bosses 47 which provide a pilot for the spring 45.

Referring again to FIG. 1, it will be observed that the helical spring 45 urges the outer sleeve 14 axially outwardly such that the serrations 31 which form the driven member of the clutch 26 are separated from the serrations 25 of the inner sleeve 13 to decouple the driven and driving members.

The manner of using the invention is as follows. The screws 38 which retain the outward housing 37 to the inner housing 3 are pre-set by the manufacturer to provide a pre-determined clamping force on the friction member 15 which will produce a desired resistance force when the housing 35 is displaced inwardly by a vehicle bumper 48 during a collision. A pair of energy absorbers 10 are preferably mounted in spaced apart parallel relationship to the structure 12 of the vehicle by fixedly attaching the flange portions 18 of the spindles 11 to the vehicle structure 12. The outward housings 37 of the energy absorbers 10 are attached by threaded fasteners (not shown) or other suitable means to the vehicle bumper 48 and support the bumper 48 on the vehicle.

At the onset of a collision, the inward displacement of the vehicle bumper 48 relative to the vehicle structure 12 moves the outer sleeve 14 inwardly and engages the serrations 31 of the outer sleeve 14 with the serrations 25 of the inner sleeve 13. Further inward displacement of the vehicle bumper 48 causes the inner sleeve 13, outer sleeve 14 and friction member 15 to rotate as a unit. The rotation of the friction member 15 inside of the tightly embracing housing 35 is resisted by the frictional forces between the friction member 15 and housing 35 and resist the inward movement of the bumper 48 at a constant force. After the collision, the spring 45 separates the serrations 31 of the outer sleeve 14 from the serrations 25 of the inner sleeve 13 and the bumper 48 is returned to its initial position by the force of the springs 45. During the return of the bumper, the forward movement of the friction member 15 on the outer sleeve 14 is restricted by the retainer 50.

From the foregoing, it is apparent that the subject invention is an effective, low cost impact absorber which develops a constant force regardless of vehicle speed. Moreover, the energy absorber can accommodate a range of vehicle weights and vehicle structures.

Although but a single embodiment of the invention has been disclosed, it will be appreciated that other embodiments can be provided by changes to the size, shape, arrangement, material and substitution of parts without departing from the spirit thereof.

What is claimed is:

1. An energy absorber for preventing vehicle damage during a collision comprising in combination:
   (a) an externally threaded spindle adapted for being fixedly mounted in a horizontal position to a vehicle structure;
   (b) an internally threaded sleeve carried on said spindle in threaded engagement with said spindle;
   (c) a friction member slideably engaging said sleeve such that said friction member is radially constrained but free to move axially on said sleeve; and
   (d) a housing fixedly attached to a vehicle bumper and tightly embracing said friction member, said housing being in cooperative relationship with said sleeve such that when said bumper and housing are inwardly displaced with respect to the vehicle structure said friction member is urged to rotate inside of said housing to provide a force to resist the inward movement of said bumper.

2. The energy absorber recited in claim 1 further comprising means for adjusting the tightness at which said housing embraces said friction member for adjusting the resistance force to the inward movement of said bumper.

3. The energy absorber recited in claim 1 further comprising a spring for displacing the bumper outwardly with repect to the vehicle structure to its initial position after said collision.

4. The energy absorber recited in claim 1 wherein said thread on said spindle and sleeve is a multiple helical thread.

5. An energy absorber for preventing vehicle damage during a collision comprising in combination:
  (a) an externally threaded spindle adapted for being fixedly mounted in a horizontal position to a vehicle structure;
  (b) a generally cylindrical internally threaded inner sleeve carried on said spindle in threaded engagement with said spindle, said sleeve having a flange portion adapted to be the driving member of a clutch;
  (c) a generally cylindrical outer sleeve carried on said inner sleeve, said outer sleeve having a flange portion adapted to be the driven member of said clutch;
  (d) a friction member slideably engaging said outer sleeve such that said friction member is radially constrained but free to move axially on said outer sleeve; and
  (e) a housing fixedly attached to a vehicle bumper and tightly embracing said friction member, said housing in cooperative relationship with said outer sleeve such that when said bumper and housing are inwardly displaced with respect to the vehicle structure said driving member is engaged with said driven member of said clutch and said friction member is urged to rotate inside of said housing to provide a constant force to resist the inward movement of said bumper.

6. An energy absorber for preventing vehicle damage during a collision comprising in combination:
  (a) a generally cylindrical spindle adapted for being fixedly mounted in a horizontal position to a vehicle structure;
  (b) a sleeve carried on said spindle;
  (c) means for rotating said sleeve when said sleeve is axially displaced on said spindle;
  (d) a friction member slideably engaging said outer sleeve such that said friction member is radially constrained but free to move axially on said sleeve; and
  (e) a non-rotatable means fixedly attached to a vehicle bumper for tightly embracing said friction member, such that when said bumper is inwardly displaced with respect to the vehicle structure said friction member is urged to rotate with respect to said embracing means to provide a constant force to resist the inward movement of said bumper.

7. In combination with a motor vehicle of the type wherein a transverse bumper is displaced inwardly with respect to the remainder of the vehicle during a vehicle collision to prevent damage to the vehicle during the collision, an energy absorber for mounting the bumper to the vehicle's structure, said energy absorber comprising a rotating friction member which produces a constant force to the inward displacement of the vehicle bumper, a clutch for engaging said rotating friction member at the onset of an impact with the vehicle bumper with said rotating means and disengaging said friction member with said rotating means after said collision, means responsive to the inward displacement of the bumper for rotating said friction member, and a spring for returning said bumper to its initial position after a collision.

8. The combination recited in claim 7 wherein said means for rotating said friction member comprises an externally threaded spindle mounted to the vehicle structure, an internally threaded member threadably carried on said externally threaded member, and means for axially displacing said internally threaded member on said spindle such that said friction member is urged to rotate about the axis of said spindle.

9. The combination recited in claim 7 further comprising means for returning said bumper to its initial position with respect to the vehicle structure after the collision.

* * * * *